US009288497B2

(12) United States Patent
Pandit et al.

(10) Patent No.: US 9,288,497 B2
(45) Date of Patent: Mar. 15, 2016

(54) ADVANCED VIDEO CODING TO MULTIVIEW VIDEO CODING TRANSCODER

(75) Inventors: Purvin Bibhas Pandit, Franklin Park, NJ (US); Paul Eric Haskell, Saratoga, CA (US)

(73) Assignee: Harmonic, Inc., San Jose, CA (US)

( * ) Notice: Subject to any disclaimer, the term of this patent is extended or adjusted under 35 U.S.C. 154(b) by 1832 days.

(21) Appl. No.: 12/497,226

(22) Filed: Jul. 2, 2009

(65) Prior Publication Data

US 2009/0268816 A1 Oct. 29, 2009

Related U.S. Application Data

(63) Continuation-in-part of application No. 12/014,717, filed on Jan. 15, 2008, now Pat. No. 8,121,191.

(60) Provisional application No. 60/987,708, filed on Nov. 13, 2007.

(51) Int. Cl.
*H04N 7/12* (2006.01)
*H04N 19/40* (2014.01)
*H04N 19/597* (2014.01)
*H04N 19/51* (2014.01)
*H04N 19/61* (2014.01)
*H04N 19/436* (2014.01)

(52) U.S. Cl.
CPC ............. *H04N 19/40* (2014.11); *H04N 19/436* (2014.11); *H04N 19/51* (2014.11); *H04N 19/597* (2014.11); *H04N 19/61* (2014.11)

(58) Field of Classification Search
CPC ..... H04N 19/597; H04N 19/51; H04N 19/40; H04N 19/436; H04N 19/61
USPC ............. 375/240.03, 240.12, 240.16, 240.25, 375/240.26; 709/231; 370/229
IPC ......................................................... H04N 7/12
See application file for complete search history.

(56) References Cited

U.S. PATENT DOCUMENTS

| | | | |
|---|---|---|---|
| 6,925,501 B2 * | 8/2005 | Wang et al. | 709/231 |
| 6,950,464 B1 * | 9/2005 | Shen et al. | 375/240.03 |
| 2006/0109900 A1 * | 5/2006 | Shen | 375/240.03 |
| 2008/0175325 A1 * | 7/2008 | Hannuksela et al. | 375/240.26 |
| 2009/0116558 A1 * | 5/2009 | Chen et al. | 375/240.16 |
| 2010/0260043 A1 * | 10/2010 | Kimmich et al. | 370/229 |
| 2010/0316136 A1 * | 12/2010 | Jeon et al. | 375/240.25 |

* cited by examiner

*Primary Examiner* — Y Lee
*Assistant Examiner* — Richard Carter
(74) *Attorney, Agent, or Firm* — Brokaw Patent Law PC; Christopher J. Brokaw (57) ABSTRACT

Systems, methods and computer program products for transcoding advanced video coding (AVC) bitstreams into multiview video coding (MVC) bitstreams are described. In some implementations, a MVC transcoder may be used to convert non-anchor pictures (e.g., at a specified temporal point) into anchor pictures by using only inter-view prediction. The MVC transcoder also may utilize inter-view reference pictures (in addition to temporal reference pictures) in the motion estimation/mode decision functions of the non-anchor pictures. The output of the MVC transcoder may be one or more MVC bitstreams each representing a different view of a same scene or image.

16 Claims, 4 Drawing Sheets

ADVANCED VIDEO CODING TO MULTIVIEW VIDEO CODING TRANSCODER

CROSS-REFERENCE TO RELATED APPLICATIONS

This application is a continuation-in-part of and claims priority to U.S. Provisional Application Ser. No. 60/987,708 entitled "AVC TO SVC TRANSCODER," filed on Nov. 13, 2007, and U.S. application Ser. No. 12/014,717 entitled "AVC TO SVC TRANSCODER", filed on Jan. 15, 2008, the disclosure of each which is incorporated herein by reference in its entirety.

TECHNICAL FIELD

The subject matter of this application is generally related to video compression.

BACKGROUND

With recent advances in video capture and display technologies, three-dimensional video communication and entertainment services are in high demand. Three-dimensional video communication and entertainment services revolutionize the way viewers and users enjoy and interact with content. Recently, the Joint Video Team (JVT) of the ISO/MPEG standardization groups has undertaken the effort to create a Multiview Video Coding (MVC) standard. MVC is an encoding framework of multi-view sequences which is produced either by a camera system including multiple cameras capturing the same event from different locations or by a single camera capable of capturing a three-dimensional scene. In applications exploiting MVC, a viewer can enjoy real and immersive experiences, as the multi-view video represents a three-dimensional scene in real space.

SUMMARY

Systems, methods and computer program products for transcoding advanced video coding (AVC) bitstreams into multiview video coding (MVC) bitstreams are described. In some implementations, a MVC transcoder may be used to convert non-anchor pictures (e.g., at a specified temporal point) into anchor pictures by using only inter-view prediction. The MVC transcoder also may utilize inter-view reference pictures (in addition to temporal reference pictures) in the motion estimation/mode decision functions of the non-anchor pictures. The output of the MVC transcoder may be one or more MVC bitstreams each representing a different view of a same scene or image.

In some implementations, a method may be used that includes receiving one or more input bitstreams, decoding the one or more received input bitstreams, and transcoding the one or more decoded input streams into one or more output bitstreams including transcoding each decoded bitstream using multiview video coding (MVC) to generate one or more MVC output bitstreams.

In some implementations, a device may be used that includes a first decoder to receive a first AVC bitstream and to generate meta-data associated with the AVC bitstream, and a transcoder to receive the meta-data and to generate a MVC output bitstream based on the meta-data.

The details of one or more embodiments of the invention are set forth in the accompanying drawings and the description below. Other features, objects, and advantages of the invention will be apparent from the description and drawings, and from the claims.

DESCRIPTION OF DRAWINGS

The invention will be described with respect to particular embodiments thereof, and reference will be made to the drawings, in which.

Like reference symbols in the various drawings indicate like elements.

DETAILED DESCRIPTION

Video Encoding Overview

The MPEG-4/AVC standard is widely used for encoding video. According to this standard, pictures can be both spatially and temporally encoded. Each picture is first divided into non-overlapping macroblocks, where each macroblock includes a 16×16 array of luminance samples and blocks of 8×8 chrominance samples overlaid thereon. A decision is made to encode the macroblock as an "inter macroblock", in which case the macroblock is both temporally and spatially encoded, or to encode the macroblock as an "intra macroblock," in which case the macroblock is only spatially encoded. A macroblock is temporally encoded by an inter-picture motion compensation operation. A prediction macroblock is identified for the to-be-motion compensated macroblock and is subtracted therefrom to produce a prediction error macroblock. The prediction macroblock originates in another picture, called a reference picture, or may be an interpolation of multiple prediction macroblocks, each originating in different reference pictures. The prediction macroblock need not have precisely the same spatial coordinates (pixel row and column) as the macroblock from which it is subtracted and in fact can be spatially offset therefrom. A motion vector is used to identify the macroblock by its spatial shift and by the reference picture from which it originates. When the prediction macroblock is an interpolation of multiple prediction macroblocks, a motion vector is obtained for each to-be-interpolated prediction macroblock.

Pictures may be classified as intra (I) pictures, predictive (P) pictures or bidirectionally predictive (B) pictures. An I picture contains only intra macroblocks. A P picture may contain inter macroblocks, but only forward directed predictions from a preceding reference picture are permitted. A P picture can also contain intra macroblocks for which no adequate prediction was found. A B picture can contain intra macroblocks, inter macroblocks that are forward direction motion compensated, inter macroblocks that are backward directed motion compensated (i.e., predicted from a succeeding reference picture), and inter macroblocks that are bidirectionally motion compensated (i.e., predicted from an interpolation of prediction macroblocks in each of preceding and succeeding reference pictures). If the P or B pictures are interlaced, then each component field macroblock can be separately motion compensated or the two fields can be interleaved to form a frame macroblock and the frame block can be motion compensated at once.

Spatial compression can be performed on selected 8×8 luminance pixel blocks and selected 8×8 pixel chrominance blocks of selected prediction error macroblocks, or selected intra macroblocks. Spatial compression includes the steps of transforming each block, quantizing each block, scanning each block into a sequence, run-level encoding the sequence and variable length encoding the run-level encoded sequence. Prior to transformation, a macroblock of a frame picture may optionally be formatted as a frame macroblock, including blocks containing alternating lines of samples from each of the two component field pictures of the frame picture, or as a field macroblock, where the samples from different fields are arranged into separate blocks of the macroblock. The quantizer scale factor may be changed on a macroblock-by-macroblock basis and the weighting matrix may be changed on a picture-by-picture basis. Macroblocks, or coded blocks thereof, may be skipped if they have zero (or nearly zero) valued coded data. Appropriate codes are provided into the formatted bitstream of the encoded video signal, such as non-contiguous macroblock address increments, or coded block patterns, to indicate skipped macroblocks and blocks.

Additional formatting is applied to the variable length encoded sequence to aid in identifying the following items within the encoded bitstream: individual sequences of pictures, groups of pictures of the sequence, pictures of a group of pictures (GOP), slices of pictures, macroblocks, and blocks within macroblocks. Some of the above layers are optional, such as the group of pictures layer and the slice layer, and may be omitted from the bitstream if desired. Various parameters and flags are inserted into the formatted bitstream as well indicating each of the above noted choices (as well as others not described above). The following is a brief list of some of such parameters and flags: picture coding type (I,P,B), macroblock type (i.e., forward predicted, backward predicted, bidirectionally predicted, spatially encoded only) macroblock prediction type (field, frame, etc.), the quantizer parameter, etc. A flag may be inserted into the encoded video signal to indicate that a field repeated during a telecine process of converting film frames to NTSC video (using the well known 3:2 pull-down technique) was omitted from the encoded video signal.

When encoding a video signal according to MPEG-4/AVC, the encoder must produce a bitstream which does not overflow or underflow the buffer of a decoder which decodes the video signal. To that end, the encoder can model the decoder's buffer and, in particular, monitor the fullness of the decoder's buffer. The decoder buffer is presumed to fill with bits of the bitstream at a particular rate which is a function of the channel rate at a certain moment of time. Pictures are presumed to be instantly removed at a particular instant relative to the decode and presentation time of each picture. Further information regarding an encoder that can be used to model a decoder buffer may be found, for example, in U.S. Pat. No. 6,091,776, the disclosure of which is incorporated herein by reference in its entirety. Using such a model, the encoder can adjust various encoding parameters to control the number of bits produced for each encoded picture in an effort to prevent overflowing or underflowing the decoder's buffer. For example, the encoder can adjust the quantizer parameter, encourage selection of certain types of encoding over others, add stuffing data to pictures, change the number of B and P pictures, change a threshold quality level used in determining whether to perform intra or inter coding of macroblocks, etc., to increase or reduce the number of bits produced for each picture. Generally speaking, the encoder forms a target bit budget for each picture, which is a function of, among other parameters, the channel rate, the decoder buffer size (normally assumed to be a certain constant), and the vacancy/occupancy of the decoder's buffer immediately before and after removal of the particular picture for which a budget is being generated. The encoder then adjusts its encoding in an attempt to achieve the target bit budget for the picture.

Multiview Video Coding

Multiview video coding (MVC) is the compression framework for encoding of multiview sequences. A MVC sequence may include a set of two or more video sequences that capture the same scene/image from a different view point or angle. Generally, video sequences or views may be encoded according to one of the conventional video encoding standards such as MPEG A picture in a video sequence may represent a full video frame or a field of a video frame, and a slice may be an independently coded portion of a picture that may include some or all of the macroblocks in the picture (and a macroblock may include blocks of picture elements such as pixels). In MVC, an anchor picture (as will be discussed in greater detail below) may be a coded picture in which all slices reference only slices with the same temporal point (e.g., only slices in other views and not slices in earlier pictures of the current view). After decoding the anchor picture, all subsequent coded pictures in display order may be decoded without inter-prediction from any picture decoded prior to the anchor picture. If a picture in one view is an anchor picture, then all pictures at the same temporal point in other views may also be treated as anchor pictures. Consequently, the decoding of any view can be initiated at a temporal point that corresponds to the anchor pictures.

To produce a multiview video sequence, an input video sequence may be encoded as the multiview video sequence using, for example, the H.264/AVC syntax. Multiview video may contain a large amount of inter-view statistical correlation, since the video capturing devices are capturing the same scene or object from different view points. Because MVC employs temporal and inter-view prediction for efficient compression, it is possible to extract just one view from the set of coded views or a combination of views depending on the application and capability.

In MVC, one or more video capturing devices may be located at different distances from the same object and/or orientations toward the same object. Multiview pictures obtained through the video capturing devices may show various degrees of reflections of light from the surface of the same object based on the angle at which the picture was captured. The characteristic of the multi-view pictures may include differences in the brightness and color of the pictures for the same object according to the particular view.

Figure 1:
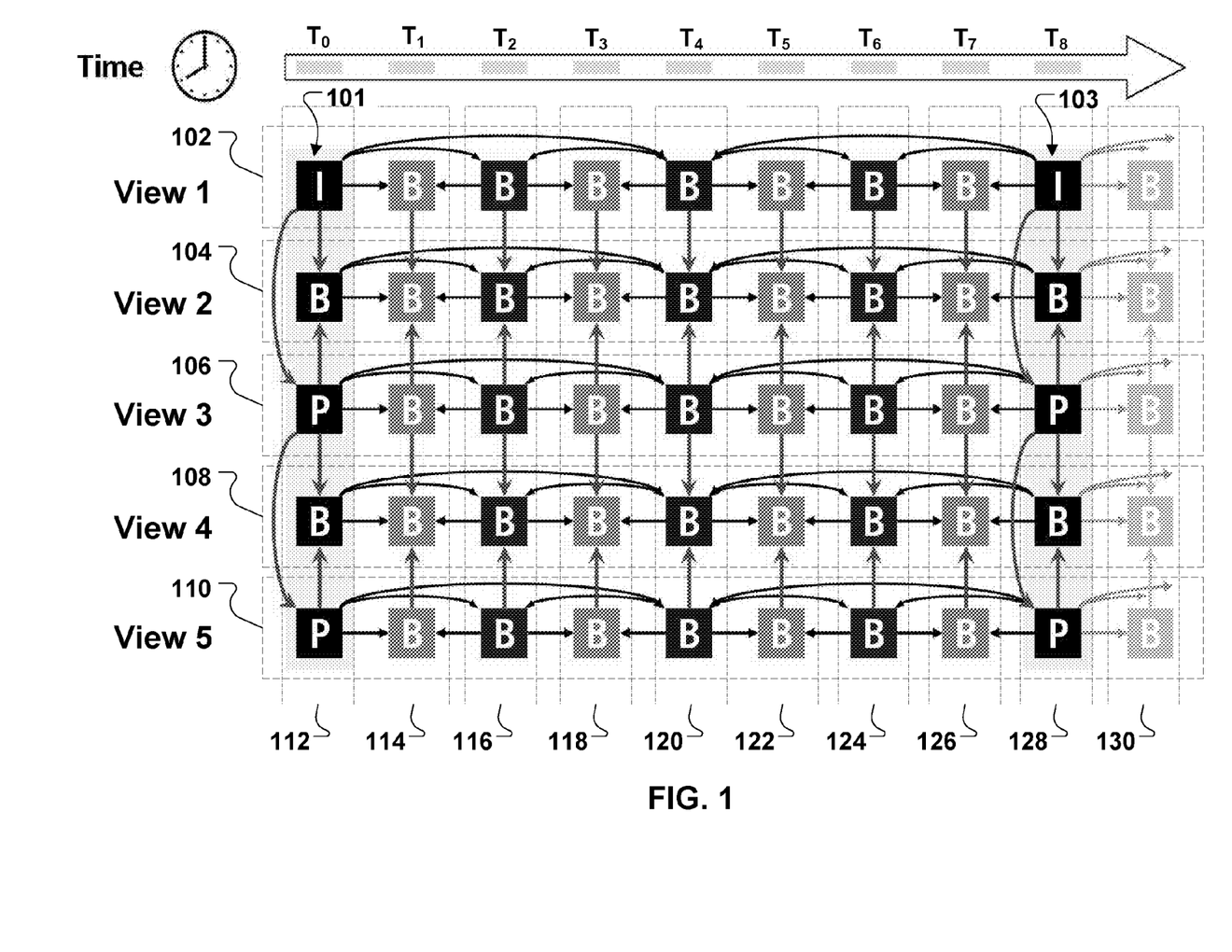
FIG. 1 shows an example of a prediction structure of a multiview video coding standard.

FIG. 1 shows an example of a prediction structure of a multiview video coding standard. The horizontal axis represents a temporal direction and the vertical axis refers to a particular view at which the picture is recorded.

As shown in FIG. 1, each row 102-110 shows an image sequence at each view for a multiview image over time, and each column shows an image sequence at five different views; namely, view 1, view 2, view 3, view 4 and view 5. View 1 may be a base view at temporal point To and the image sequence 102 in the first row (e.g., image sequence 102) may be described as the image sequence at the base view. Pictures included in the image sequence 102 at the base view may be predictive-encoded using only temporal prediction without using inter-view prediction.

Since a multi-view video source may include multiple views of the same scene, there exists a high degree of correlation between the multiple view images. Therefore, view redundancy may be exploited in addition to temporal redundancy and may be achieved by performing view prediction across the different views. Accordingly, in some implementations, pictures other than those in the base view may be predictive-encoded using both temporal and inter-view prediction.

Video streams may include three types of frames or pictures; namely, the intra picture ("I" picture), predictive picture ("P" picture), and bi-directionally predictive picture ("B" picture). The "I" picture is characterized by a codification of the picture by, for example discrete cosine transform, without using motion estimation/compensation. A "P" picture is characterized as having motion estimation/compensation and may predict be predicted based on "I" or other "P" pictures. The "B" picture is characterized as allowing motion compensation, similar to the "P" picture, and may include motion estimation/compensation from two pictures on the time/temporal axis.

Generally, temporal prediction may be performed using temporal correlation between images at the same view, whereas inter-view prediction may be performed using spatial dependency between images at a same temporal point (e.g., same column). Pictures included in the image sequence 102 of the base view (view 1) may be prediction-encoded by performing only temporal prediction, rather than inter-view prediction. An intra picture (e.g., "I" picture 101 or "I" picture 103) may be periodically generated (e.g., every eighth image) for an image at the base view while temporal prediction or inter-view prediction may be performed based on the intra picture to predictive-encode other pictures.

In some implementations, "I" pictures may appear only in image sequences at the base view (e.g., image sequence 102), but not in image sequences at other views. In other words, "I" pictures may appear only in positions corresponding to anchor pictures (as will be discussed below) in the image sequence at the base view.

Each column 112-130 may include one or more multiview images captured at a same temporal point. Pictures included in a column, including any intra picture, may be referred to as anchor pictures. For example, pictures captured at a first temporal point such as temporal point $T_0$, and $N^{th}$ multiple (e.g., N=8) temporal points such as temporal points Ts may be referred to as anchor pictures. An anchor picture (e.g., a picture in column 128) may be a picture of a first temporal point which may be decoded without referring to another picture of a second temporal point as a reference picture (e.g., without referring to pictures in column 114). The decoding of an anchor picture at a temporal point and a first viewpoint may refer to only an anchor picture of the same temporal point and a second viewpoint as a reference picture (e.g., at temporal point $T_0$, "P" picture at view 3 may refer to "I" picture at view 1). Accordingly, the encoding of an anchor picture may not utilize motion-compensated prediction; rather, anchor pictures may be encoded by performing only inter-view prediction. For example, at a same temporal point, view 2 may perform inter-view prediction using view 1 and view 3; view 3 may perform inter-view prediction using view 1; view 4 may perform inter-view prediction using view 3 and view 4; and view 5 may perform inter-view prediction using view 3.

Pictures other than anchor pictures may be referred to as non-anchor pictures. Non-anchor pictures, in some implementations, may use a combination of temporal and inter-view references. For example, a MVC transcoder (as will be discussed in greater detail below with respect to FIG. 5) may be used to convert non-anchor pictures (e.g., at a specified temporal point) into anchor pictures by using only inter-view prediction. The MVC transcoder may utilize inter-view reference pictures (in addition to temporal reference pictures) in the motion estimation/mode decision functions of the non-anchor pictures.

As discussed above, an input video sequence may be encoded as the multiview video sequence using, for example, the H.264/AVC standard by enabling inter-view prediction. In some implementations, the processing requirements of MVC may increase linearly with respect to the number of views. In some implementations, no new coding tools need be introduced in MVC, and only high level syntaxes are changed.

MVC Transcoder

Video transcoding generally involves converting data compressed according to a certain video codec into compression data of another video codec or into a different type of compression data of the same video codec. For example, video transcoding may be required when a user device (e.g., a terminal device) supports only a certain video codec, when an amount or speed of data to be transmitted has to be controlled according to a condition of a network, or when users request various services such as a high-quality video content service or a high speed service.

In some implementations, a transcoder may be used as a multi-view transcoder to transcode one or more AVC input bitstreams into one or more MVC bitstreams. Specifically, a MVC transcoder may be used to encode MVC, via a transcode operation from one or more AVC bitstreams each representing a unique view of MVC. In some implementations, at least one view in the MVC bitstream may be AVC compatible. For example, at least one view need not use inter-view prediction and may be encapsulated in AVC syntax.

In some implementations, the MVC transcoder may geometrically correct and spatially combine images (or pictures) at different viewpoints captured by two or more video capturing devices (e.g., video cameras, video recorders, and the like) to provide a viewer with various types of images. A multiview image processing device also may be used to geometrically correct images taken through a plurality of video capturing devices and perform spatial synthesis and other image processes. The resulting multiview video may thus provide the viewer with an image at a specified viewpoint (or variety of views in multiple directions), and enable the viewer to experience a three-dimensional effect through sequences of multiple views of pictures (or scenes). The MVC transcoder may utilize conventional AVC hardware or software encoders to reduce the complexity of the MVC transcoder.

Figure 2:
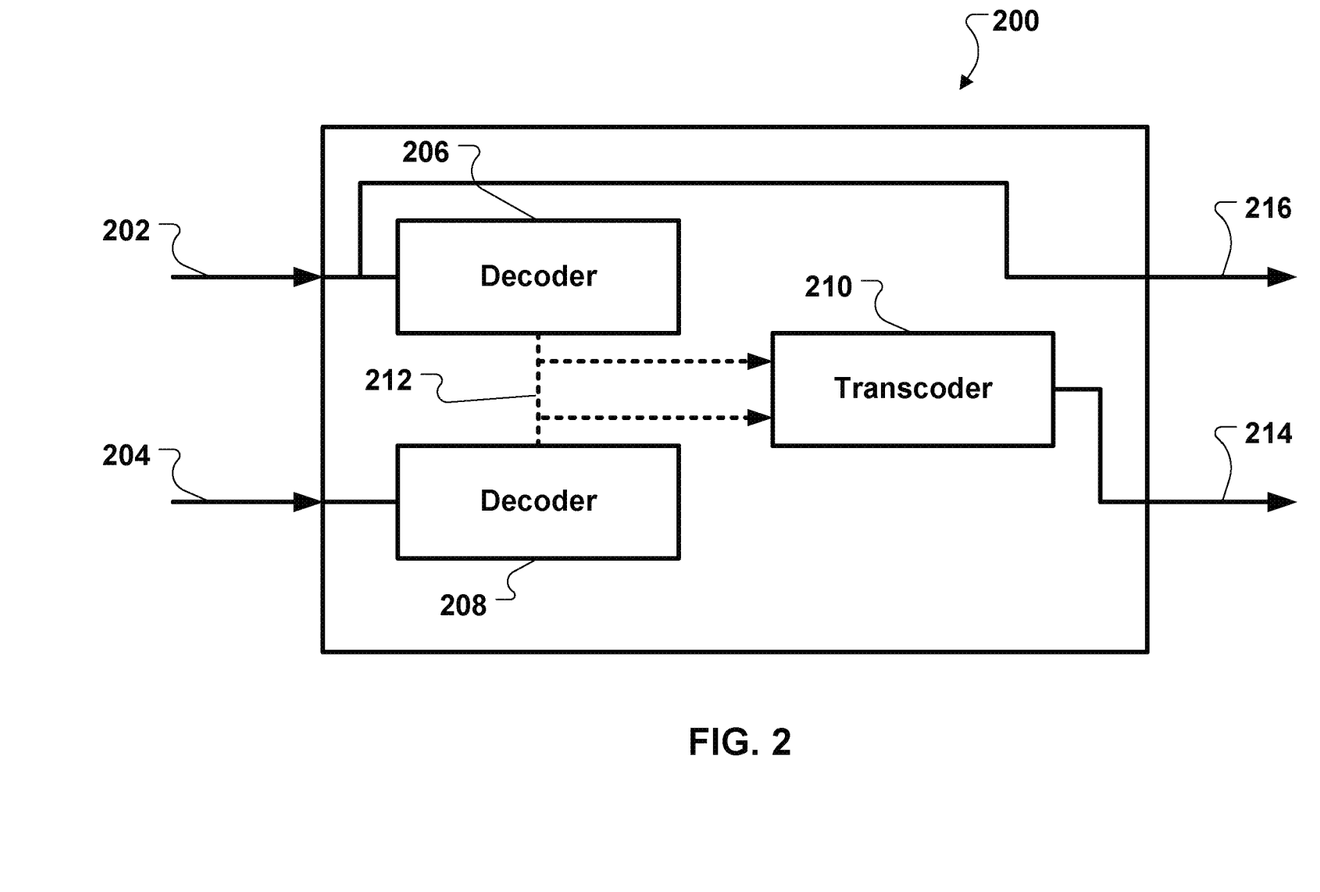
FIG. 2 shows an example MVC transcoder.

FIG. 2 shows an example of an MVC transcoder 200. As shown, the MVC transcoder 200 may include a first decoder 206, a second decoder 208 and a transcoder 210. In some implementations, the MVC transcoder 200 may be used to encode one or more AVC input bitstreams 202/204 using a transcode operation to generate one or more MVC output bitstreams. Specifically, the MVC transcoder 200 may receive one or more AVC input bitstreams 202/204 each representing a unique view of a scene (and corresponding view of the MVC output). The MVC transcoder 200 may decode the one or more AVC input bitstreams 202/204, and transcode a portion or all of the AVC input bitstreams 202/204 using MVC. In some implementations, the MVC transcoder 200 may use a neighboring view as an inter-view reference in addition to or instead of the same-view reference pictures.

In some implementations, the first decoder 206 may receive a first AVC input bitstream 202, and the second decoder 208 may receive a second AVC input bitstream 204. In some implementations, each AVC input bitstream 202/204 may represent a different camera view or image. Outputs of the first decoder 206 and the second decoder 208 may be fed to the MVC transcoder 210. Upon receiving the outputs 212 of the decoders 206/208, the transcoder 210 may generate a MVC output bitstream 214.

In some implementations, the MVC output bitstream 214 may include an enhancement view compressed video stream (e.g., containing additional view information). In other implementations, the MVC output bitstream 214 may also include a base layer compressed video stream 216 (e.g., an AVC compatible bitstream). In these implementations, the MVC transcoder 200 may combine the enhancement view compressed video stream and the base layer compressed video stream to produce the MVC output bitstream 214 to enhance the three-dimensional view of a scene.

In some implementations, the MVC transcoder 210 may use the first AVC input bitstream 202 as a basis for coding the second AVC input bitstream 204. In these implementations, the MVC transcoder 210 may generate an MVC stream with lighter computational load than that required for a conventional MVC encoder.

The MVC transcoder 200 also may transcode each or some of the views using MVC. The MVC transcoder 200 may choose to use a neighboring view as an inter-view reference in addition to or in place of the same-view reference picture(s). Although only two AVC input bitstreams are shown in FIG. 2, more than two AVC input bitstreams may be provided to and transcoded by the MVC transcoder 200.

In some implementations, the base view may be coded at a desired bitrate (e.g., by an AVC encoder to be discussed below) while all other remaining views may be coded at a rate higher than that of the pictures in the base view. In these implementations, rate control may be used for all the other views to ensure that the all other views may be coded at a rate higher than that of the pictures in the base view.

In some implementations, all the remaining views may be considered in implementing a rate control. In these implementations, certain views may be given more weight than other views for rate control. For example, rate control may give more weight to some views by using smaller, finer quantization stepsizes for encoding. This may cause more bits, more bit-rate, to be spent on the views with more weight. Also, the MVC transcoder 200 may use mode decisions and motion vectors that are already coded in the AVC input bitstreams to make decisions with very little processing required.

In some implementations, to further reduce the complexity of the MVC transcoder 200, the MVC transcoder 200 may encode (or transcode) only the pictures at the anchor locations. In some implementations, all the input AVC bitstreams are coded only at a particular rate (e.g., 10%) above the target bitrate for a given view. The MVC transcoder 200 may then transcode only the picture that corresponds to an anchor position (since only inter-view prediction may be used).

In some implementations, the MVC transcoder 200 may be implemented using a general purpose computing system (e.g., computer system 610 shown in FIG. 6). The AVC input bitstreams and the MVC output bitstreams may be carried over an IP/Ethernet interface of the computing system. In some implementations, the MVC transcoder 200 need not perform motion estimation. Where the motion vectors and mode decisions of the AVC bitstreams are stored in a memory (or cache), the MVC transcoder 200 may extract such data from the memory and reuse them to produce the MVC output bitstreams.

Figure 3:
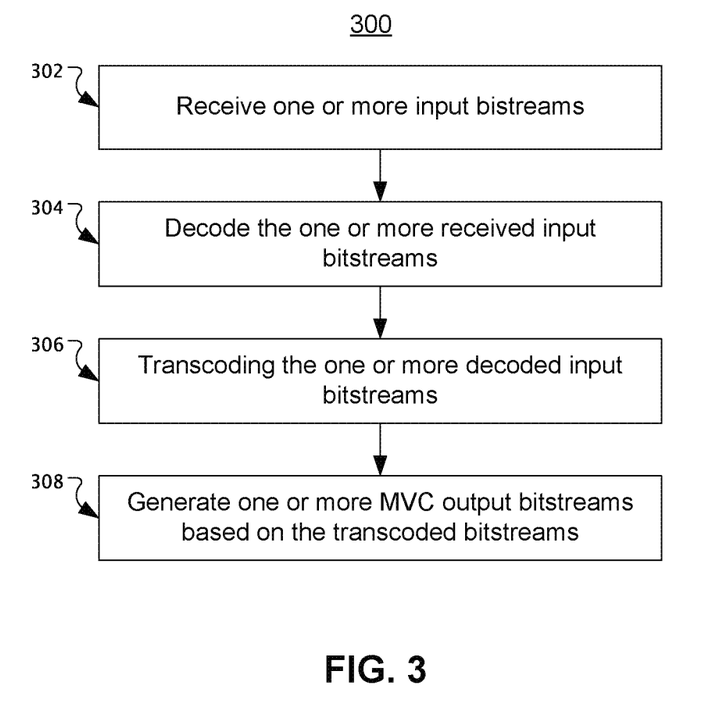
FIG. 3 is a flow chart showing an example of a MVC transcoding process.

FIG. 3 is a flow chart showing an example MVC transcoding process 300. The process 300 may be performed, for example, by the MVC transcoder 200, and for clarity of presentation, the description that follows uses the MVC transcoder 200 as the basis of examples for describing the process 300. However, another system/device, or combination of systems/devices, may be used to perform the process 300.

As shown in FIG. 3, process 300 beings with receiving one or more input bitstreams (302). In some implementations, the one or more input bitstreams may include at least one AVC bitstream. The one or more received input bitstreams may be decoded (304). The one or more decoded input bitstreams may then be transcoded (306). Based on the transcoded bitstreams, one or more MVC output bitstreams may be generated (308).

In some implementations, operations 302-308 may be performed in the order listed, or in parallel (e.g., by the same or a different process, substantially or otherwise non-serially). In other implementations, operations 302-308 may be performed out of the order shown. Also, the order in which the operations are performed may depend, at least in part, on what entity performs the method. Operations 302-308 also may be performed by the same or different entities or systems.

As used herein, the terms "video stream" and "output stream" are intended to include not only the picture data itself, but all the meta-data required to reconstruct the full pictures at some quality level. These streams are sometimes referred to herein as "bit streams", but the units of the stream in various embodiments can be bits, bytes, picture fields, frames, or any other unit that is appropriate for the embodiment.

Exemplary Computer System

Figure 4:
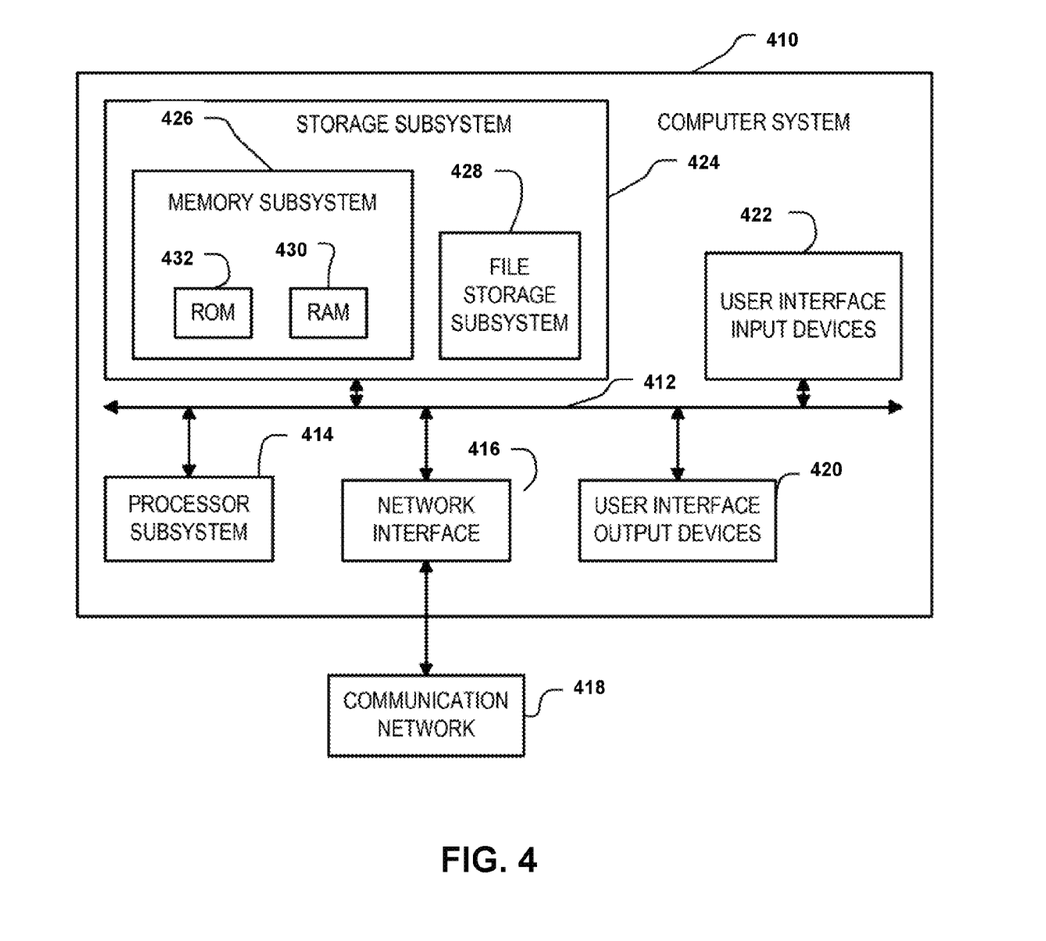
FIG. 4 is a simplified block diagram of a computer system.

FIG. 4 is a simplified block diagram of a computer system 410 that can be used to implement software incorporating the MVC transcoder 200. In this regard, while FIG. 1 illustrates individual components as carrying out specified operations, it will be appreciated that in a software embodiment each component actually causes the computer system 410 to operate in the specified manner. The individual components may be housed in separate software modules in the computer system, or they may be combined into a single module, or a combination of both, and flow through the modules can be sequential or pipelined.

Computer system 410 typically includes a processor subsystem 414 which communicates with a number of peripheral devices via bus subsystem 412. These peripheral devices may include a storage subsystem 424, comprising a memory subsystem 426 and a file storage subsystem 428, user interface input devices 422, user interface output devices 420, and a network interface subsystem 416. The input and output devices allow user interaction with computer system 410. Network interface subsystem 416 provides an interface to outside networks, including an interface to communication network 418, and is coupled via communication network 418 to corresponding interface devices in other computer systems. Communication network 418 may comprise many interconnected computer systems and communication links. These communication links may be wireline links, optical links, wireless links, or any other mechanisms for communication of information. While in one embodiment, communication network 418 is the Internet, in other embodiments, communication network 418 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 422 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 410 or onto computer network 418.

User interface output devices 420 may include a display subsystem, a printer, a fax machine, or non visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 410 to the user or to another machine or computer system.

Storage subsystem 424 stores the basic programming and data constructs that provide the functionality of certain embodiments of the present invention. For example, the various modules implementing the functionality of certain embodiments of the invention may be stored in storage subsystem 424. These software modules are generally executed by processor subsystem 414.

Memory subsystem 426 typically includes a number of memories including a main random access memory (RAM) 430 for storage of instructions and data during program execution and a read only memory (ROM) 432 in which fixed instructions are stored. File storage subsystem 428 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 428. The host memory contains, among other things, computer instructions which, when executed by the processor subsystem 414, cause the computer system to operate or perform functions as described herein. As used herein, processes and software that are said to run in or on the host" or the computer", execute on the processor subsystem 414 in response to computer instructions and data in the host memory subsystem 426 including any other local or remote storage for such instructions and data.

Bus subsystem 412 provides a mechanism for letting the various components and subsystems of computer system 410 communicate with each other as intended. Although bus subsystem 412 is shown schematically as a single bus, alternative embodiments of the bus subsystem may use multiple busses.

Computer system 410 itself can be of varying types including a personal computer, a portable computer, a workstation, a computer terminal, a network computer, a television, a mainframe, or any other data processing system or user device. Due to the ever changing nature of computers and networks, the description of computer system 410 depicted in FIG. 4 is intended only as a specific example for purposes of illustrating embodiments of the present invention. Many other configurations of computer system 410 are possible having more or less components than the computer system depicted in FIG. 4.

As used herein, a given signal, stream or picture sequence is "responsive" to a predecessor signal, stream or picture sequence if the predecessor signal, stream or picture sequence influenced the given signal, stream or picture sequence. If there is an intervening processing element, step or time period, the given signal, stream or picture sequence can still be "responsive" to the predecessor signal, stream or picture sequence. If the intervening processing element or step combines more than one signal, stream or picture sequence, the signal output of the processing element or step is considered "responsive" to each of the signal, stream or picture sequence inputs. If the given signal, stream or picture sequence is the same as the predecessor signal, stream or picture sequence, this is merely a degenerate case in which the given signal, stream or picture sequence is still considered to be "responsive" to the predecessor signal, stream or picture sequence. "Dependency" of a given signal, stream or picture sequence upon another signal, stream or picture sequence is defined similarly.

While the present invention is disclosed by reference to the preferred embodiments and examples detailed above, it is understood that these examples are intended in an illustrative rather than in a limiting sense. Numerous variations will be apparent to the reader. As an example, while the techniques described herein are described relative to systems addressing MPEG video coding standards, it will be appreciated that many of them are equally applicable to other video compression protocols as well.

Where appropriate, the systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, a composition of matter effecting a machine-readable propagated signal, or a combination of one or more of them.

A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving two or more input bitstreams including receiving at least one advanced video coding (AVC) bitstream;
   decoding the two or more received input bitstreams; and
   transcoding the two or more decoded input streams into one or more output bitstreams including transcoding each decoded bitstream using multiview video coding (MVC) to generate one or more MVC output bitstreams.

2. The method of claim 1, further comprising:
   generating the at least one AVC bitstream including a base view without using inter-view prediction.

3. The method of claim 1, where receiving two or more input bitstreams includes receiving two or more input bitstreams each representing a different view or image.

4. The method of claim 1, where generating one or more MVC output bitstreams includes generating at least one MVC output bitstream that includes at least one anchor picture.

5. The method of claim 1, where transcoding each decoded bitstream using MVC includes converting one or more images associated with the two or more input bitstreams into one or more anchor pictures using only inter-view prediction.

6. The method of claim 1, where receiving two or more input bitstreams includes receiving a first and second input bitstreams with the first input bitstream being encoded at higher rate than the second input bitstream.

7. The method of claim 6, where the first input bitstream includes a base view of the MVC.

8. The method of claim 1, where transcoding each decoded bitstream includes reencoding a picture of a decoded bitstream that corresponds to an anchor position.

9. A device comprising:
   a first decoder to receive a first AVC bitstream and to generate meta-data associated with the first AVC bitstream; and
   a transcoder to receive the meta-data and to generate a MVC output bitstream based on the meta-data.

10. The device of claim 9, further comprising:
    a second decoder to receive a second bitstream,
    where the transcoder generates the MVC output bitstream based on the first AVC bitstream and the second bitstream.

11. The device of claim 10, where the first AVC bitstream and the second bitstream each includes a different view of the MVC output bitstream.

12. The device of claim 10, where the second bitstream includes a second AVC bitstream, the first AVC bitstream being encoded at a higher rate than the second AVC bitstream.

13. The device of claim 9, where the MVC output bitstream includes a base view compressed video stream and one or more additional view compressed video streams.

14. The device of claim 9, where the meta-data includes view information associated with the first AVC bitstream.

15. The device of claim 9, where the transcoder trancodes the meta-data to generate the MVC output bitstream.

16. The device of claim 9, where the meta-data is associated with one or more pictures at anchor locations.

* * * * *